Patented Apr. 25, 1939

2,155,673

UNITED STATES PATENT OFFICE 2,155,673

ANTHRAQUINONE PRODUCTS AND METHOD OF MAKING

Alfred Miller, Orchard Park, N. Y., assignor to National Aniline & Chemical Company, Inc., New York, N. Y., a corporation of New York No Drawing. Application February 2, 1937, Serial No. 123,615

11 Claims. (Cl. 260—377)

This invention relates to new anthraquinone products. It is particularly directed to 1-amino-2-nitro-4-acylamino-anthraquinones and to their preparation.

The compounds of the present invention may be represented by the following general formula:

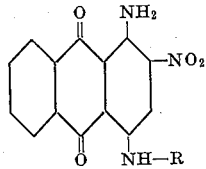

wherein R represents an acyl group of an aromatic carboxylic acid or an aliphatic carboxylic acid which may or may not contain an aryl group as a substituent thereof, for example:

—OC.C$_6$H$_5$, —OC.C$_6$H$_4$.NO$_2$, —OC.C$_6$H$_4$.COOH, —OC.C$_{10}$H$_7$, —OC.CH$_3$, —OC.CH$_2$Cl, —OC.C$_2$H$_5$, —OC.C$_3$H$_7$, —OC.COOH, —OC.CH$_2$.CH$_2$.COOH, —OC.OCH$_3$, —OC.O.C$_2$H$_5$, —OC.CH$_2$.C$_6$H$_5$, or —OC.CH : CH.C$_6$H$_5$.

I have found that the above compounds may be prepared by the partial hydrolysis of 1,4-diacylamino-2-nitro-anthraquinones of the general formula:

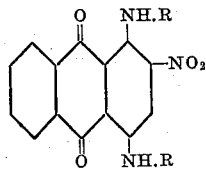

wherein R represents an acyl group as above defined.

The compounds of this invention may be reduced to the corresponding 1,2-diamino-4-acylamino-anthraquinones by procedures normally applicable to the reduction of nitro compounds, for example, by treatment with sodium sulfide. The diamino compounds are of particular value for the preparation of 1,2-imidazole-4-acylamino-anthraquinones which are valuable for the dyeing of cotton textiles and other vegetable fibers.

In the past it has been recognized that certain acylamino-anthraquinone compounds may be subjected to hydrolysis with the formation of the corresponding amino-anthraquinones. However, as far as I am aware, it has not been known heretofore that the hydrolysis of the 1,4-diacylamino-2-nitro-anthraquinones may be controlled to transform the acylamino group in ortho-position to the nitro group into an amino group without substantially affecting the acylamino group in the meta-position to the nitro group, and thus to provide initial materials suitable for use in the preparation of the imidazole dyestuffs.

In order to prepare the compounds of the present invention an appropriate amount of a 1,4-diacylamino-2-nitro-anthraquinone compound of the type described is dissolved in sulfuric acid and vigorously agitated until the partial hydrolysis has been effected. When the reaction is complete, the sulfuric acid mixture is drowned in cold water to cause precipitation of the 1-amino-2-nitro-4-acylamino-anthraquinone compound. The precipitated compound may be isolated, washed free from acid, and dried in accordance with accepted practice.

It has been found that the hydrolytic reaction may be carried out efficiently by the use of widely varied concentrations of sulfuric acid, including oleum, provided the temperature and time of reaction are suitably regulated. Thus from 70% H$_2$SO$_4$ up to 5% oleum are satisfactory concentrations. Concentrations between about 85% and about 95% H$_2$SO$_4$ provide especially rapid and effective hydrolysis without undesirable side reactions.

As indicated above, the preferred temperature of reaction is related to the acid concentration employed. For instance, if highly concentrated acid is used, the temperature of reaction may be low, whereas if a less concentrated acid is used a higher temperature is advantageous. In general, using the preferred acid concentration, the hydrolysis may be effected at controllable speeds at temperatures between about 5° C. and about 75° C. With compounds of the type described in which R is an aromatic acyl group, the hydrolysis may be carried out to advantage at a temperature between about 5° C. and about 30° C., or more preferably between 10° and 25° C., while with the urethane derivatives a temperature between about 65° and about 75° C. may be used to advantage.

To determine when the reaction is complete, one of the following methods may be used. During the course of reaction the color of the reacting compound changes quite markedly. Consequently, the progress of the hydrolysis may be determined by isolating a sample of the product, dissolving it in sulfuric acid and comparing the color of the solution with that of a similar solution prepared from a pure sample of the product which is being prepared. When the colors of the equivalent solutions are substantially alike, the reaction may be adjudged complete. The progress of the hydrolysis may be followed also by measuring from time to time the quantity of by-product which is formed during the reaction. For example, during the hydrolysis of 1,4-dibenzoylamino-2-anthraquinone, benzoic acid is set free and can be isolated and measured quantitatively. Similarly during the hydrolysis of 2-nitro-1,4-anthraquinone diurethane, ethyl carbonic acid is liberated which decomposes to yield carbon dioxide which can be measured. By comparing the quantity of such materials obtained after any given interval of time with the quantity which should theoretically be obtained assuming complete reaction, the extent of the reaction may be determined.

The following examples illustrate the process of this invention, the proportions of reacting materials being denoted in parts by weight:

*Example 1.*—About 10 parts of 2-nitro-1, 4-dibenzoylamino-anthraquinone were dissolved with rapid agitation in about 100 parts of 93% sulfuric acid, the temperature of the solution being maintained throughout this procedure between about 10° C. and about 20° C. When complete solution was obtained the mass was diluted with cold water, whereupon 1-amino-2-nitro - 4 - benzoylamino - anthraquinone precipitated. The reaction mixture was filtered and the product, which remained on the filter, was washed with cold water until free from acid, and then dried.

The product of this reaction is a violet blue solid which dissolves in 88% sulfuric acid to yield a faintly brown solution, which upon gradual addition of water turns blue and deposits blue crystals of 1-amino-2-nitro-4-benzoyl-amino-anthraquinone.

*Example 2.*—About 10 parts of 2-nitro-1, 4-anthraquinone diurethane were dissolved with rapid agitation in about 100 parts of 93% sulfuric acid, the temperature of the solution at no time being permitted to rise above about 75° C. The solution thus obtained was stirred at 70°–75° C. until no further evolution of carbon dioxide was noticed. The reaction mixture was then diluted with a large quantity of cold water and the blue precipitate which formed was separated by filtration. This product was washed with cold water until free from acid and was then dried.

The resulting 1-amino-2-nitro-4-anthraquinone urethane, in the dry state, is a violet blue solid which dissolves in 88% sulfuric acid to yield a faintly reddish-violet solution which, upon gradual dilution with water, turns blue and precipitates blue crystals of unchanged 1-amino-2-nitro-4-anthraquinone urethane.

In a similar manner 1-amino-2-nitro-4-acetylamino-anthraquinone, 1-amino-2-nitro-4-oxalylamino-anthraquinone, and 1-amino-2-nitro-4-phthalylamino-antraquinone, and other acyl-amino compounds of this type, may be prepared.

As will be understood, the process of this invention is not restricted to the details given in the above examples but variations may be made without departing from the scope thereof.

As indicated above, the products of this invention are valuable dyestuff intermediates. They may be reduced by treatment with a reducing agent, for example, with an alkaline sulfide such as ammonium or sodium sulfide to yield the corresponding 1,2-diamino-anthraquinones, which also are valuable intermediates for use in the preparation of dyestuffs.

The following example illustrates the reduction of the compounds of my invention to the corresponding 1,2-diamino-anthraquinones.

*Example 3.*—About 10 parts of 1-amino-2-nitro-4-benzoyl-amino-anthraquinone in the form of a wet paste were stirred with about 175 parts of an aqueous solution containing about 4.5% to 5% by weight of sodium sulfide, ($Na_2S$) and the mixture was heated gradually with agitation to about 65° C. at which temperature it was further agitated for about two hours. As the temperature of the mass was raised, the blue color of the 1-amino-2-nitro-4-benzoylamino-anthraquinone changed to the green shade of the partially reduced compound. After the mass had been stirred for about two hours, the mixture assumed a violet-brown color corresponding to that of the reduction product, 1,2-diamino-4-benzoylamino-anthraquinone. When the reduction was completed, the reaction mass was filtered and the insoluble crystals of 1,2-diamino-4-benzoylamino-anthraquinone were washed with water until the washings were neutral to Brilliant yellow indicator; the cake was then dried.

If desired, instead of stirring the reduction mass of the above example at 65° C. for two hours, it may be boiled for about ½ hour, at the end of which time the reaction is usually complete.

I claim:

1. As new products, 1-amino-2-nitro-4-acylamino-anthraquinones.

2. As a new chemical compound 1-amino-2-nitro-4-benzoylamino-anthraquinone.

3. As a new chemical compound 1-amino-2-nitro-4-anthraquinone-urethane.

4. The method of preparing a 1-amino-2-nitro-4-acylamino-anthraquinone, which comprises subjecting a 1,4-diacylamino-2-nitro-anthraquinone to the hydrolytic action of sulfuric acid to remove the acyl group in ortho position to the nitro group.

5. The method of preparing a 1-amino-2-nitro-4-acylamino-anthraquinone, which comprises subjecting a 1,4-diacylamino-2-nitro-anthraquinone to the hydrolytic action of sulfuric acid.

6. The method of preparing a 1-amino-2-nitro-4-acylamino-anthraquinone, which comprises subjecting a 1,4-diacylamino-2-nitro-anthraquinone to the hydrolytic action of sulfuric acid at a temperature between about 5° C. and about 75° C.

7. The method of preparing a 1-amino-2-nitro-4-acylamino-anthraquinone, which comprises subjecting a 1,4-diacylamino-2-nitro-anthraquinone to the hydrolytic action of sulfuric acid having a concentration between about 70% $H_2SO_4$ and about 5% oleum.

8. The method of preparing a 1-amino-2-nitro - 4 - aliphatic - acylamino - anthraquinone, which comprises subjecting a 1,4-aliphatic-diacylamino-2-nitro-anthraquinone to the hydrolytic action of sulfuric acid having a concentration between about 70% $H_2SO_4$ and about 5% oleum at a temperature between about 5° C. and about 75° C.

9. The method of preparing a 1-amino-2-nitro - 4 - aromatic - acylamino - anthraquinone, which comprises subjecting a 1,4-aromatic-diacylamino-2-nitro-anthraquinone to the hydrolytic action of sulfuric acid having a concentration between about 85% and about 95% at a temperature between about 5° C. and about 30° C.

10. A process for the manufacture of 1-amino-2-nitro-4-benzoylamino-anthraquinone, which comprises subjecting 2-nitro-1,4-dibenzoylamino-anthraquinone to the action of aqueous concentrated sulfuric acid solution at a temperature between about 10° C. and about 25° C. to hydrolyze the benzoylamino group in 1-position, diluting the product with cold water to precipitate the 1-amino-2-nitro-4-benzoylamino-anthraquinone, and separating the precipitate from residual solution.

11. A process for the manufacture of 1-amino-2-nitro-4-anthraquinone-urethane, which comprises subjecting 2-nitro-1,4-anthraquinone diurethane to the action of aqueous concentrated sulfuric acid solution at a temperature between about 65° and about 75° C. to hydrolyze the urethane group in 1-position, diluting the product with cold water to precipitate the 1-amino-2-nitro-4-anthraquinone-urethane, and separating the precipitate from residual solution.

ALFRED MILLER.